F. A. HILL.
GANG-PLOWS.
No. 7,204.
Reissued July 4, 1876
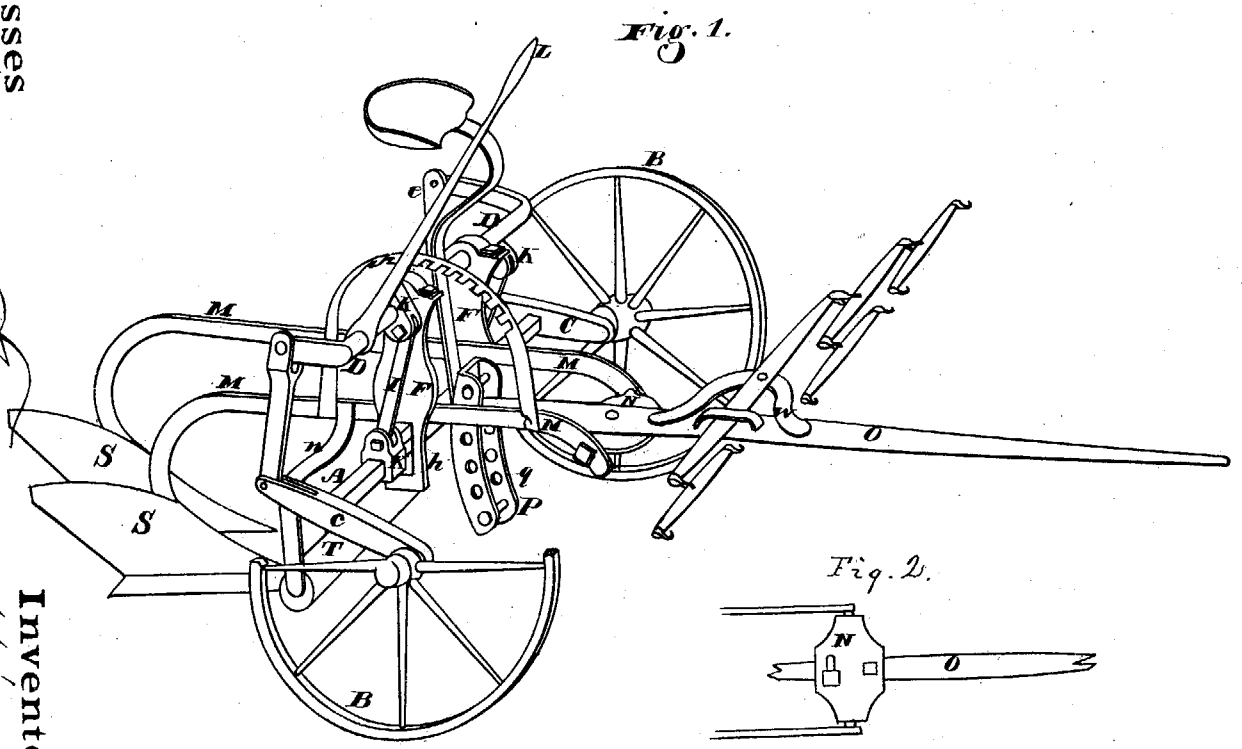
Witnesses
Geo. H. Strong.
Jno. L. Bond
Inventor
Frank A. Hill
by Dewey & Co.
Attys.
N. PETERS, PHOTO-LITHOGRAPHER, WASHINGTON, D. C.

UNITED STATES PATENT OFFICE.

FRANK A. HILL, OF SAN LEANDRO, CALIFORNIA.

IMPROVEMENT IN GANG-PLOWS.

Specification forming part of Letters Patent No. 170,262, dated November 23, 1875; reissue No. 7,204, dated July 4, 1876; application filed May 23, 1876.

*To all whom it may concern:*

Be it known that I, FRANK A. HILL, of San Leandro, Alameda county, State of California, have invented an Improved Gang-Plow; and I do hereby declare the following description and accompanying drawings are sufficient to enable any person skilled in the art or science to which it most nearly appertains to make and use my said invention or improvement without further invention or experiment.

My improvement relates to a novel arrangement for elevating the plows and plow-frame in order to lift the plows out of the ground and carry them clear of the surface of the ground.

Referring to the accompanying drawings, Figure 1 is a perspective view of my improved plow. Fig. 2 is a plan of the pole and attaching-plate.

Let A represent the axle, and B B the bearing-wheels. The wheels B B are attached to cranks C C, one of which is secured to each end of the axle. The arm of the cranks, which is attached to the axle, is extended beyond the axle, so as to provide a lever-arm, *d*, and the ends of these extended arms are connected with the bent ends of the shaft D by connecting bars or links *e*, in the same manner as is represented and described in Letters Patent No. 94,491, which were granted to me on the 7th day of September, 1869. This shaft D, however, I mount in a different manner. The standards F F, upon which the shaft is supported, have their lower ends slotted, as at *h*, and the axle A passes through these slots. The slots *h* are longer in a vertical direction than the width of the axle, so as to allow the standards to move up and down independent of the axle. Just outside of each standard a short crank, K, is secured to the shaft D, and a connecting-bar, I, is arranged to connect the crank with the axle, so that, when the shaft D is turned by the lever L, the throw of the crank K will cause the standards F F to raise and lower. The beams M M of the plow-frame are attached to the standards F F, so that the lifting of the standards by the throw of the cranks will also lift the plow-frame, and thus raise the plows so much higher from the surface of the ground than if they were attached directly to the axle. The forward ends of the plow-beams M M I bend downward, as represented, so that they extend below the line of the axle. Between the forward ends of the beams I secure a plate, N, by means of journals which bear in the opposite beams. The pole O is secured upon this plate, and its front end is thus permitted to raise and lower about the journals of the plate N as a center. The pole is secured to the front edge of the plate by a bolt which passes vertically through the pole and plate, while it is secured to the rear edge of the plate by a bolt which passes through a transverse slot in the plate, thus permitting the forward end of the pole to be shifted to either side as far as the slot will allow the bolt to move. The pole being thus attached at a point below the axle, the draft will cause the plows to enter and remain in the ground, even if the pole is not rigidly secured. Upon the axle A, directly in rear of the pole O, I secure a block or casting, P, the front face of which is curved and provided with a vertical groove, *q*, through its entire length. The rear end of the pole O extends back, so as to fit in the groove in this block. The sides of the groove are perforated with corresponding holes, so that a pin or bolt can be passed across the groove, both above and below the end of the pole, and thus limit its motion.

I thus provide a gang-plow with a limber pole which, owing to its manner of attachment below the line of the axle, will be equally as effective as a rigid pole to keep the plow in the ground, while, at the same time, the plows are free to follow the inequalities of the ground, which they could not do if the pole was rigid.

In California much of the land is uneven, or what is known as "hog-wallow," so that a plow with a rigid pole would often carry the plows entirely out of the ground in passing over ridges; but with this limber-pole plow the plows will always follow the irregularities without lifting.

If desired, the pole could be fixed rigidly in place by confining its rear end firmly in the block or casting P.

I am aware that a patent was issued to Gilpin Moore, on the 19th day of January, 1875, for an improved gang-plow, in which the rear end of the pole was secured to a transverse plate which extended across between the beams, and on which the end of the pole could be shifted so as to change the line of draft laterally. This plate was also arranged to slide vertically upon a rod; but by my arrangement it will be seen that the rear end of the pole is entirely free, but moves in a vertical groove in the block or casting P.

My arrangement also enables me to secure the pole in a fixed position, at any required elevation or angle. My arrangement is also much more simple and easier operated than that referred to above.

Directly in front of the plows S S I prefer to suspend a roller, T, from the plow-beams by means of links or hangers, *n*, so that when the plows are in the ground the roller will bear upon the surface of the ground in advance of the plows, and break down stubble and weeds, so that they will lie flat, and thus be turned over with the sod to the bottom of the furrow.

When three wheel-horses are employed for drawing the plow I use a three-horse equalizing-whiffletree, V, so that one horse can work on the furrow side of the pole, and two on the land side.

By the above-described arrangement I greatly improve the gang-plow, and not only render it more easily handled but increase its efficiency.

Having thus described my invention, what I claim is—

1. The standards F F, which support the shaft D, and to which the beams M M are secured, having the slots *h*, through which the axle A passes, in combination with the cranks K K, connecting-bars I I, shaft D, and lever L, substantially as and for the purpose set forth.

2. The lever L, crank-shaft D, link *e*, and crank-axle A *d e*, in combination with the slotted standards F F, cranks K, links I, and plow-beams M M, all constructed and arranged substantially as and for the purpose described.

3. The vertically-grooved block or casting P, perforated as described, and arranged to be adjusted laterally between the beams M M, in combination with the pole O and journaled plate N, substantially as and for the purposes described.

In witness whereof I have hereunto set my hand and seal.

FRANK A. HILL. [L. S.]

Witnesses:
GEO. H. STRONG,
CHAS. G. PAGE.